(12) United States Patent
Berlemont et al.

(10) Patent No.: US 6,787,588 B2
(45) Date of Patent: Sep. 7, 2004

(54) ARTICLE MADE OF POLYMER HAVING A SHADED APPEARANCE OF ANISOTROPIC COLORING CONSTITUTED BY INDIVIDUALIZED ELEMENTS, THE MANUFACTURING THEREOF AND THE APPLICATION THEREOF AS A SURFACE COATING

(75) Inventors: Jacques Berlemont, Paris (FR); Xavier Poupon, Paris (FR)

(73) Assignee: Etablissements Boulenger, Paris (FR)

( * ) Notice: Subject to any disclaimer, the term of this patent is extended or adjusted under 35 U.S.C. 154(b) by 0 days.

(21) Appl. No.: 10/278,018

(22) Filed: Oct. 23, 2002

(65) Prior Publication Data

US 2003/0092798 A1 May 15, 2003

Related U.S. Application Data

(63) Continuation of application No. 10/007,697, filed on Dec. 10, 2001.

(30) Foreign Application Priority Data

Oct. 24, 2001 (FR) .............................................. 01 13732
May 17, 2002 (FR) .............................................. 02 06078

(51) Int. Cl.[7] ................. C08J 3/22; C08J 3/20
(52) U.S. Cl. ................ 523/346; 523/348; 523/351; 428/221
(58) Field of Search ................ 523/346, 348, 523/351; 428/221

(56) References Cited

U.S. PATENT DOCUMENTS

| | | | |
|---|---|---|---|
| 2,314,062 A | 3/1943 | Alvey et al. | |
| 2,495,241 A | 1/1950 | Eaby | |
| 2,761,176 A | 9/1956 | Welch et al. | |
| 3,529,325 A | 9/1970 | Duggins | |
| 3,570,056 A | 3/1971 | Hall et al. | |
| 5,232,644 A | 8/1993 | Hammond et al. | |
| 5,962,557 A | * 10/1999 | Weaver et al. | ................. 524/35 |
| 6,017,984 A | * 1/2000 | Schonfeld et al. | ........... 524/190 |

FOREIGN PATENT DOCUMENTS

| | | |
|---|---|---|
| EP | 0 952 124 | 10/1999 |
| FR | 1 082 699 | 12/1954 |
| FR | 1 604 220 | 10/1971 |
| FR | 2 268 621 | 11/1975 |
| FR | 2 541 296 | 8/1984 |
| FR | 2 627 518 | 8/1989 |

OTHER PUBLICATIONS

Patent Abstract of Japan vol. 011, No. 196, Jun. 24, 1987. JP62 019409, Fujikura Ltd.
Patent Abstract of Japan vol. 008, No. 120, Jun. 6, 1984. JP 59 024627, Toyo Linoleum Mfg Co. Ltd.
Bulletin des Avis Technique 12/97–1125 (Sep. 1998), Haltopex Haltopex Polyvalent Sportside.
Bulletin des Avis Technique 12/98–1143 (Jan.–Feb. 1999), Cibelastic.

* cited by examiner

*Primary Examiner*—Tae H. Yoon
(74) *Attorney, Agent, or Firm*—Jacobson Holman PLLC (57) ABSTRACT

A process for transforming a polymer base, having a shaded appearance of anisotropic coloring, into a finished article, the process including operations of mixing a base polymer and additives, of adding a shading colorant to the polymer mixture, followed by incomplete homogenization of the shading colorant in the polymer mixture to form the polymer base with a shaded appearance of anisotropic coloring, subsequent shaping to an intermediate predetermined shape, and vulcanization and cooling as applicable, and then an operation of breaking up the shaded polymer base into individualized elements and an operation of aggregation of the elements, to obtain the finished article, in any desired arrangement. It also relates to a finished article, having such anisotropy, constituted by an agglomerate of individualized elements, and its application as a surface coating.

26 Claims, 3 Drawing Sheets

ARTICLE MADE OF POLYMER HAVING A SHADED APPEARANCE OF ANISOTROPIC COLORING CONSTITUTED BY INDIVIDUALIZED ELEMENTS, THE MANUFACTURING THEREOF AND THE APPLICATION THEREOF AS A SURFACE COATING

This is a Continuing application of co-pending application Ser. No. 10/007,697 filed on Dec. 10, 2001.

BACKGROUND OF THE INVENTION

1. Field of the Invention

The present invention relates to a process for transforming a polymer base into a polymer based finished article comprising individualized elements and presenting a shaded appearance of anisotropic coloring. "Individualized elements" should be read as meaning pieces or basic constituent elements forming distinct entities the minimum size of which is sufficient for observation of coloring anisotropy. The "shaded appearance of anisotropic coloring" should be read as meaning random variation of coloring existing in all directions from any point in the body of the individualized elements. The present invention also relates to a polymer based finished article comprising individualized elements having such a shaded appearance of anisotropic-coloring. Such a polymer based finished article comprising individualized elements can be obtained, in particular, through the use of the process according to the invention.

2. Prior Art

Various processes are known, according to the prior art, for producing polymer based manufactured products, for example polymer surface coatings. The specific final form desired for such products is obtained using an apparatus supplying, for instance, slabs of varying size and thickness or widths, which are then applied as they are by gluing or any other means to the support to be coated. Such products can also be used, after cutting to the desired shape and size, as patterns in floor coatings cast in situ, these patterns being arranged in a predetermined fashion and inserted without joints into a flexible resin, such as that described by the Applicant in patent EP 0 743 405.

Various methods are also known for producing cast surface coatings based on polymer granules incorporated in a resin type binder. One can thus obtain a cast surface coating that is essentially inalterable under usual conditions of wear, and the visual appearance of which is of the mosaic, single color or multicolored type.

By way of example can be mentioned patent FR 2 541 296 which describes such cast coatings based on rubber granules, which may be colored, and which are spread in practically random fashion and inserted into a binder. The processes for manufacturing such products intended, for example, for the manufacture of surface coatings, include steps of mixing a base polymer with additives, of extrusion, of calendering or some other shaping, of vulcanization and then of cooling the mixture, as applicable, and final shaping, for example as panels, slabs or widths by shape conferring equipments. Furthermore, such products are usually colored by adding colorants at the time they are manufactured. The aim is to obtain products of a homogeneous color. Multicolored surface coatings are, indeed, obtained by mixing several colors, or shades of color, of polymer products obtained during successive manufacturing operations. Thus, all the polymer products of each type, or batch, are identical, with an isotropic coloring, that is to say homogeneous in the body of the product. The coatings obtained with these products have the drawback of having an artificial visual appearance, because they are uniform, in comparison with hard natural materials such as, for example, marble or stones or the like, whether crushed or not.

To overcome this drawback, arrangements are made to manufacture in works surface coatings produced with these products but having shades of coloring. Such shades of coloring can be obtained by dispersion of an added layer of colorant on the surface or by encrusting colored materials, which makes it impossible to carry out sanding or buffing to renovate the appearance thereof. Moreover, the visual appearance obtained with these processes fails to cause the artificial appearance to disappear completely.

U.S. Pat. No. 2,495,241 discloses that, in mixtures of polymers, intended for the manufacture of asphalt tiles, a contrasting colorant is incorporated so that the operation of mixing this colorant with the mixture of polymers leads to irregular distribution of the colorant in the mixture, this operation is terminated before the colorant has become uniformly mixed.

U.S. Pat. No. 3,570,056 discloses a process for manufacturing polymer products simulating marble and a device permitting the manufacture of articles of a rectangular shape in the form of large sheets comprising veins of colorant imparting thereto non-homogeneous coloring. U.S. Pat. No. 3,529,325 discloses a device the configuration of which permits the implementation of a process for the manufacture of polymer based products usable as building materials, in the form, for example, of strips in the bodies of which there are three-dimensional veined patterns of coloring.

These manufactured products, which are modular finished products, represent an improvement, but there remains a need, in this field, to obtain polymer based articles having very irregularly distributed surface coloring, yielding a non-artificial appearance by comparison with materials formed of slabs of natural marble or fragments of natural marble and/or crushed marble or the like and that is resistant to wear.

The present invention aims to achieve this result, by means of a simple, inexpensive process.

SUMMARY OF THE INVENTION

The invention relates to a process for transforming a polymer base, having a shaded appearance of anisotropic coloring, into a finished article, the process including operations of mixing a base polymer and additives, of adding a shading colorant to the polymer mixture, followed by incomplete homogenization of the shading colorant in the polymer mixture to form the polymer base with a shaded appearance of anisotropic coloring, subsequent shaping to an intermediate predetermined shape, and vulcanization and cooling as applicable, and then an operation of breaking up the shaded polymer base into individualized elements and an operation of aggregation of said elements in any desired arrangement to obtain the finished article. It also relates to a finished article, having such anisotropy, constituted by an agglomerate of individualized elements, and its application as a surface coating.

DETAILED DESCRIPTION OF THE INVENTION

The invention provides a process for transforming a polymer base, having a shaded appearance of anisotropic coloring, into a finished article, said process including operations of mixing a base polymer and additives, of adding a shading colorant to the polymer mixture, followed by incomplete homogenization of the shading colorant in the polymer mixture to form the polymer base with a shaded appearance of anisotropic coloring, subsequent shaping to an intermediate predetermined shape, and vulcanization and cooling as applicable, said process being characterized in that the above operations are followed by an operation of breaking up the shaded polymer base into individualized elements and an operation of aggregation of said elements in any desired arrangement to obtain the finished article.

Thus, the process according to the invention makes it possible to obtain a polymer based finished article formed from a plurality of individualized elements, each having coloring anisotropy. This article is a finished product that can be movable, such as, for example, a molded article, or immovable, such as a surface coating. The individualized elements are pieces or basic constituent elements, kinds of fragments that are distinct from one another by virtue of their own anisotropy and having a size above a minimum such that coloring anisotropy is visible. As these pieces are assembled in any predetermined manner desired, their initial arrangement, in the body of the shaded polymer base, does not reappear in the finished article. This article therefore has shading that can be very randomly distributed, since it comprises two successive degrees of freedom resulting, on one hand, from incomplete homogenization and, on the other hand from breaking up, or fragmentation, which releases or separates various pieces from the mass of the shaded polymer base, that is to say which breaks the veins of incomplete homogenization, and then to assemble these pieces according to a chosen disposition or arrangement that can thus be of any kind and pseudo-random. The invention thus has the originality of comprising two reverse operations which, apart from a change in shape, do not basically cause any mechanical modification since the "single-piece" characteristic of the body of the shaded polymer base reappears in the article according to the invention. The breaking up provides the second degree of freedom in the volume distribution of the shading colorant, which enables the pieces thus obtained to be placed in any given mutual positions, for example pseudo-random ones, in the final article according to the invention.

By way of example, the individualized elements can take the form of panels of determined geometrical shapes or of any given shapes, advantageously designed to provided a polymer based finished article such as, for example, a surface coating constituted by these panels inserted into a holding binder and presenting non-homogeneous shades of color from one polymer panel to another and, in general, within each polymer panel. This makes it possible to confer to the finished article an esthetic effect that is far closer to the one obtained with natural materials such as slabs of marble or other stones, hence to eliminate the artificial appearance linked with this type of synthetic polymer coating. On the other hand, the fact that the anisotropic coloring is provided in the body of the polymer panel makes it possible to subject the finished articles to successive renovation operations by means of sanding or buffing, without any risk of the shaded coloring disappearing since it is produced in the body of the panel, and not in an added surface layer.

The individualized elements can also take the form of polymer granules, intended to provide a polymer based finished article such as a surface coating constituted of agglomerated granules and having shades of colour that are non-homogeneous from one granule to another and, in general, within each individual granule. This obviates the need to use several batches of granules of different colors or shades. This makes it possible, above all, to confer to the finished article an esthetic effect that is much closer to the one obtained with natural materials such as marbles or other stones, and hence to banish the artificial appearance associated with this type of synthetic polymer coating. On the other hand, the anisotropic coloring present in the body of the polymer granule makes it possible to carry out successive operations of renovation by sanding or buffing of the finished article, without any risk of the coloring disappearing, as this coloring is produced within the body of the granule, and not in an added surface layer.

The invention thus includes a step of adding a shading colorant at a step in the process so that it is not homogeneously mixed with the polymer mixture, i.e. a base polymer and additives. In particular, if the time taken to mix the other components of the polymer mixture is greater than the coloring duration of the polymer mixture, it is excluded to add the shading colorant at the start of the mixing step. This shading colorant must then be added after the start of this period of components mixing, that is to say during it. There can also be foreseen a specific shading colorant mixing operation after the end of the primary constituent mixing step.

The different components that go into the preparation of the polymer mixture are, for example, introduced into a mixer, with the exception of the colorant or colorants serving to carry out the anisotropic coloring according to the invention, hereinafter referred to as shading colorant(s), with this term being used to cover either a single colorant or a mixture of several colorants. These components include one or more base polymers to which are added habitual additives such as fillers, oils or plasticizers and vulcanizing agents. If need be, basic coloring products can be added, in proportions known to a person skilled in the art, these being completely mixed to give the polymer mixture a color or tint, with which the color(s) or tint(s) of the shading colorant will subsequently be combined. The base polymers are starting materials which are advantageously selected from the polymers, or their derivatives, of the following types: rubber, styrene-butadiene rubber (SBR), ethylene-propylenediene monomere(EPDM), elastomers or thermoplastic synthetic high polymers. The homogeneous mixture of these components is hereinafter referred to as a "primary polymer mixture".

According to one form of embodiment of the process according to the invention, the shading colorant leading to the desired effect is added to the primary polymer mixture before complete homogenization of the latter, that is to say that the components of this mixture are first of all brought together, and then this mixture is homogenized and, before this homogenization is complete, the shading colorant is added to the mixture. Homogenization is then continued in such a way as to be complete in the case of the components of the primary mixture but incomplete in that of the shading colorant added subsequently. It is, for example, continued for a duration determined in order to maintain a certain color anisotropy, that is to say to obtain the desired coloring anisotropy effects. In other words, this duration is limited to a maximum threshold corresponding to the desired degree of anisotropy. This duration, which is determined by prior testing, is referred to as the "mixture coloring duration".

According to another embodiment of the process according to the invention, the shading colorant is added after total homogenization of the primary polymer mixture. An additional mixing step is then carried out in order to obtain an incomplete homogenization of the shading colorant corresponding to the desired coloring anisotropy.

According to one preferred embodiment of the process according to the invention, the primary polymer mixture is prepared in an internal mixer, hot, preferably in a final temperature range for the homogenization operation of between approximately 100° C. and approximately 150° C. The shading colorant is introduced into the mixer when the temperature is at least approximately 100° C., and preferably between 120° C. and 130° C., and/or when the mixing operation has lasted only a fraction of the total time needed to obtain the satisfactory homogenization of the primary mixture, this fraction being greater than 75% of this time and preferably greater than 90%.

The colorant used can be, for example, a colorant usually used in the technical field of the invention such as organic pigments or metallic oxides.

When the mixing time necessary to obtain the homogeneity of the primary polymer mixture has elapsed, the polymer mixture, namely the polymer base, with the anisotropic coloring shades thus obtained is discharged from the mixer into a shredder which feeds a predetermined or intermediate shape conferring apparatus, for example an extruder. This operation of intermediate shaping of the polymer mixture with the anisotropic coloring shades is designed to provide a plastic polymer product with anisotropic coloring shades such as, for example, a polymer strip, a cylindrically shaped product, bars, yarns, etc. which is then subjected to a vulcanization operation by means such as hot air, salt bath or microwaves. The vulcanization temperature will be chosen according to the nature of the polymer mixture, to the length of the vulcanizing tunnel and to the nature of the vulcanizing agents, that is to say the vulcanization initiators and accelerators, and, preferably, it will be between approximately 200° C. and approximately 280° C. The vulcanized polymer product is then cooled down to ambient temperature by usual means such as water or air.

According to other embodiments of the process according to the invention, the primary polymer mixture can be prepared in any suitable type of mixer, and, in particular, a roll mixer, the shading colorant mixture can be carried out in the equipment producing the primary polymer mixture or in a specific apparatus, the plastic polymer can be obtained, prior to the vulcanizing operation, by using any suitable means, such as an extruder, a rolling machine or a calendering machine, when the polymer product presenting anisotropic coloring shades is manufactured from a thermoplastic base polymer, for example of the PVC or SBS type, a primary polymer mixture, namely a thermoplastic base polymer and additives, commercially available, can also be used, which makes it possible to dispense with the mixing operation enabling the primary polymer mixture to be obtained. Furthermore, with thermoplastic polymers, the vulcanization operation is no longer required, and addition of the shading colorant to the primary polymer mixture can be carried out during extrusion, for example using an extruder equipped with a device permitting its introduction into the appropriate area, depending on the desired anisotropic coloring effect.

Moreover, the addition of the shading colorant can, in the case of certain types of coloring anisotropy, and depending on the characteristics of the equipment used for intermediate shaping prior to vulcanization, be carried out directly at the feed input of said shaping equipment also performing incomplete homogenization of the shading colorant.

The subsequent operation in the process is to transform the polymer product with the anisotropic coloring shades by breaking it up into pieces or fragments designed to serve as basic elements in manufacturing a final article of the desired shape.

Thus, in one form of embodiment, when the polymer product takes the form of a polymer strip with anisotropic coloring shades, such a breaking up operation can consist of cutting the polymer strip, for example using a hollow punch type apparatus. According to the internal configuration of the cutting apparatus, it can supply individualized elements in the form either of panels of polymer of various sizes and determined geometrical shapes, for example square or rectangular shapes, or of panels forming decorative patterns, that is to say representing, for example, letters, figures, symbols, familiar characters, etc., or again panels of any shape. Depending on the desired shape, these panels can be of sizes smaller than or equal to that of the polymer strip.

Any polymer strip scrap or the strip with punch holes resulting from the preceding breaking up operation are further subjected to a grinding operation. This operation leads to polymer granules with variable color shades. The size of these granules will be chosen according to their future use. These granules are then mixed together to obtain a homogeneous whole, for example in a mixer of the revolving drum type or a troughs mixer.

In another alternative embodiment, the individualized elements in the form of polymer granules are directly obtained by means of the breaking up operation consisting of crushing all of the polymer product with anisotropic coloring shades such as the polymer strip described previously. This operation leads to granules with variable color shades also having the characteristics described previously.

Figure 1:
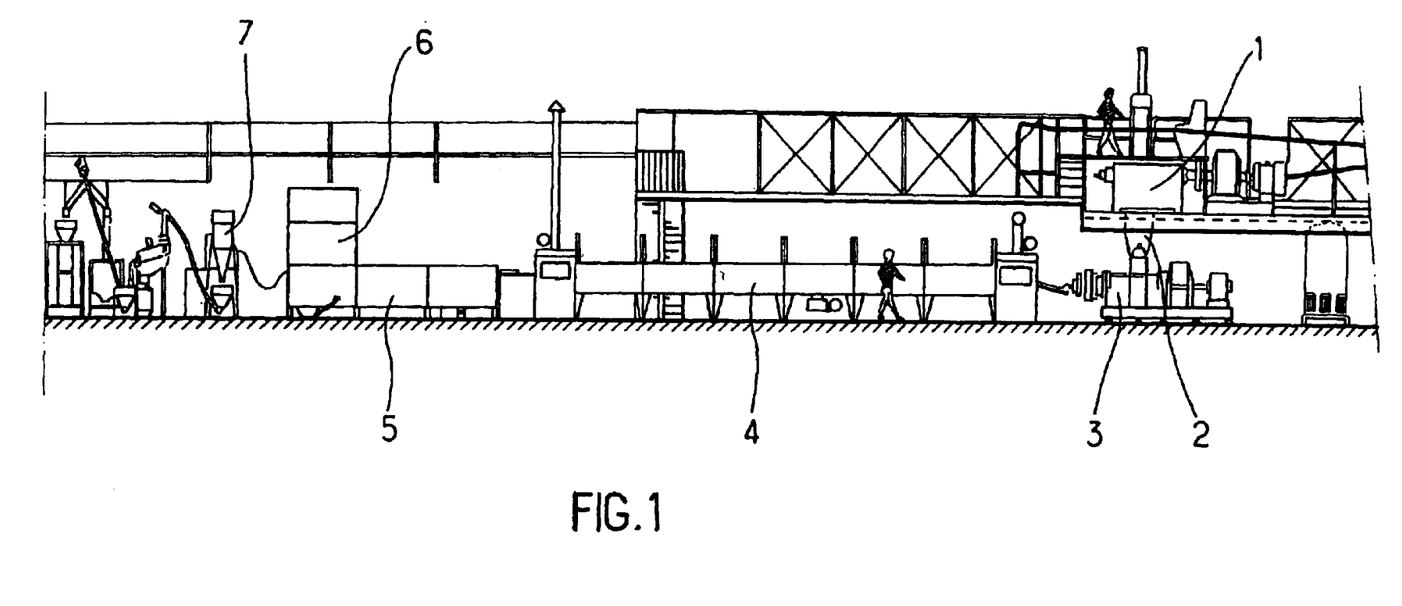
FIG. 1 is a side view of the continuous process for obtaining panels according to the invention.

These successive operations of the process for obtaining individualized elements having anisotropic coloring shades, for example in the form of polymer panels, are thus implemented on a continuous production line (FIG. 1). This thus permits control, first of all, over the mixing of the different constituents to achieve an adequate homogenization of the base polymer with the various additives, and then of the various physical parameters such as temperature and the mixing, extrusion, and vulcanization times.

According to one alternative embodiment of the process for obtaining individualized elements, the operations previously described can be carried out batchwise. These operations essentially reproduce those described earlier and also enable individualized elements having anisotropic coloring according to the invention to be obtained. However, implementation of the process involves certain specific variants, as follows:

the polymer mixture, having a shaded appearance of anisotropic coloring is introduced into an intermediate shape conferring apparatus of the roll mixer or calendering machine type in order to obtain a sheet of the desired thickness, prior to the vulcanizing operation, according to another arrangement, the shading colorant is not integrated into the primary polymer mixture but is introduced at the rolls of the mixer or at the calender also leading to incomplete homogenization of the shading colorant in the body of the polymer mixture thus obtained. Apart from the shading colorant, the vulcanizing agents can also be added at this stage. This then permits possible storage of the polymer mixture without any risk of incipient vulcanization, the vulcanizing operation is carried out in an autoclave oven at a temperature preferably between approximately 200° C. and approximately 280° C.

One of the advantages of batchwise implementation of the process is that it is possible to have for this purpose simple equipment that can be adapted to the addition of the shading colorant enabling the desired anisotropy of coloring to be obtained for the polymer mixture.

Although it is advantageous to use appropriate equipment for mass production, the different stages in the process for obtaining the individualized elements do not exclude manual implementation.

The subsequent operation of the process according to the invention consists in aggregating or agglomerating the individualized elements to manufacture polymer based finished articles, with a shaded appearance of anisotropic coloring, according to a pseudo-random arrangement as a function of the desired visual appearance. The agglomerating operation can be carried out using any method known in the state of the art and can consist, for example, in incorporating individualized elements in a suitable binder, preferably organic, known to a person skilled in the art, or in rendering the individualized elements integral with one another by placing them in contact and heating them at suitable temperatures to preclude any risk of deterioration.

Another object of the invention is a polymer based finished article comprising an agglomerate of individualized elements, wherein each element can be of different a size and shape in relation to another given element, having a more or less marked shaded appearance of anisotropic coloring. This appearance of coloring anisotropy in the body of the polymer based finished article is obtainable, in particular, through the use of the process according to the invention described previously. This finished article according to the invention can form, for example, surface coatings, slabs or tiles, widths or molded articles such as those intended for uses as complements to coatings, for example skirtings or beadings, but also articles for bathrooms, etc., comprising an agglomerate of individualized elements of determined geometrical shapes or any shapes and various dimensions, for example of the following types: squares or rectangular panels, representational patterns or granules of a size lying within a given range.

When the individualized elements with anisotropic coloring are, for example, in the form of a panel of polymer, the visual appearance of such a panel will vary according to its own shades of coloring and the polymer panels as a whole has a coloring shading effect that can, in particular, be rendered close to the effect produced by natural materials such as slabs of marble or stone. It is also possible, by using a mixture of shading colorants, to obtain for each panel an appearance of non-homogeneous multi-colored shading.

According to one form of embodiment of the invention, the above individualized elements in the form of panels can be designed for use as representational patterns or can be of any shape in a process for manufacturing surface coatings of the ®Silasol type, cast in situ, said patterns being arranged in a predetermined fashion and inserted without joints into a flexible resin, according to the process described by the Applicant in patent EP 0 743 405. Alternatively, said patterns can be arranged in a random fashion.

According to another form of embodiment of the invention, granules with anisotropic coloring shades obtained as previously described can be advantageously incorporated in the flexible resin.

Figure 2:
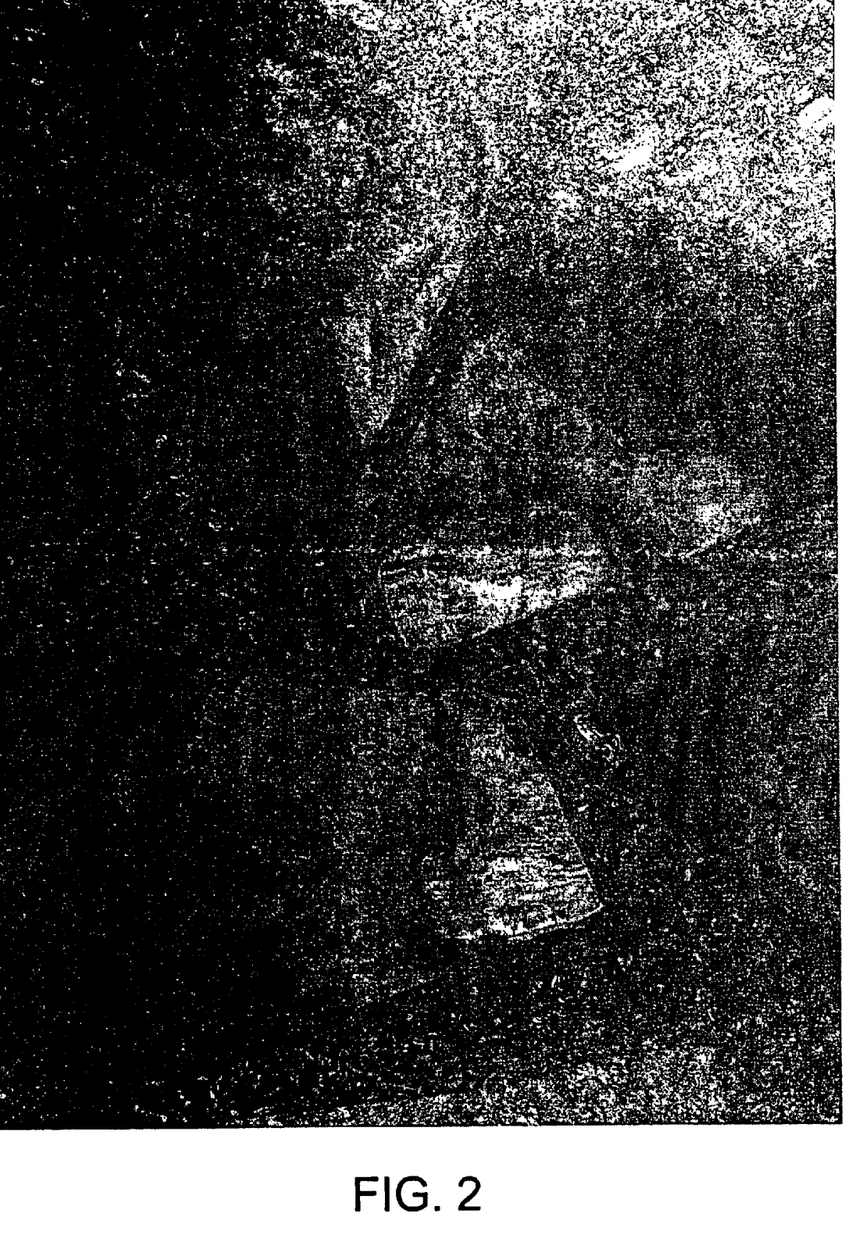
FIG. 2 is a partial view of a cast surface coating according to the invention.

FIG. 2 is a partial view of such a cast surface coating according to the invention. These surface coatings provide an esthetic effect very close to that of materials constituted by slabs of natural marble, crushed marble or the like.

The individualized elements in the form of polymer granules obtained, for example, by means of a breaking up operation consisting in crushing the polymer product, also have characteristics of anisotropic shading in the body of each granule and the polymer granules as a whole present a coloring shading effect that can, in particular, be rendered close to that produced by natural materials, crushed marble or stone. This is obtainable by using the process described previously. These polymer granules are advantageously intended for use in the manufacturing of surface coatings cast in situ, that is to say directly on site, for example wall and floor coatings of the ®Haltopex type according to the process disclosed by the Applicant in French patent FR 2 541 296, and of the ®Cibélastic type. Panels with anisotropic coloring shades described above can also be incorporated in these types of granule based coatings. These granules according to the invention can also be used to manufacture molded articles such as those intended for use as complements to coatings, for example skirtings or beadings, but also as articles for bathrooms, etc.

Figure 3:
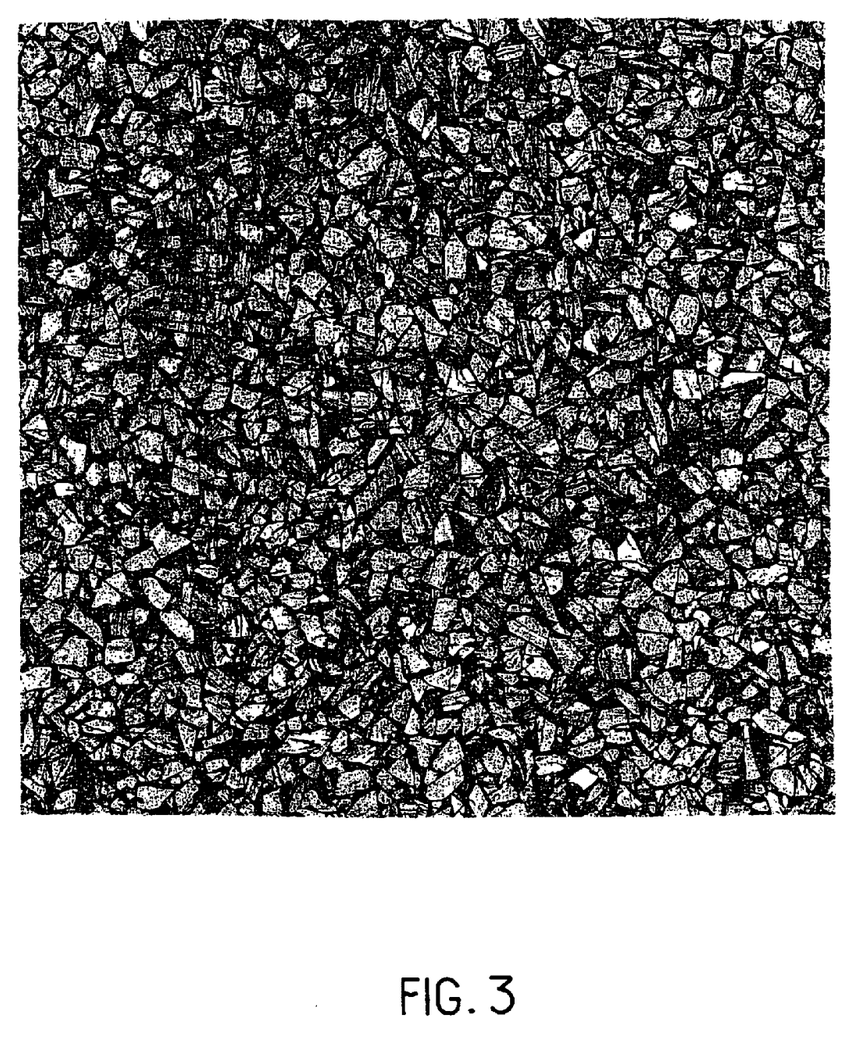
FIG. 3 is an example of another cast surface coating according to the invention.

FIG. 3 presents an example of such a cast surface coating according to the invention. The carrying out and the technical characteristics of surface coatings according to the invention obtained from granules are described in No. 12/97-1125 (September 1998) and in No. 12/98-1143 (January–February 1999) of the Bulletin des Avis Techniques (Bulletin of Technical Opinions). However, the granules according to the invention have a visual appearance comparable with that of natural solid materials, crushed or not, such as obtained, for example, by crushing marble or various other stones.

Examples of implementation of the continuous process for the manufacture of individualized elements with anisotropic coloring in the form of polymer panels (FIG. 1 and Example 1) or of polymer granules (Example 2) according to the invention are given hereinafter. Example 3 illustrates the manufacture of a floor coating of the ®Haltopex type. These examples are given by way of illustration and are not to be considered as limitative of the invention.

EXAMPLE 1

17 kg of rubber and the additives, plasticizer (1 kg), fillers (37 kg), vulcanizing agents (2 kg) and a basic colorant (3 kg) are introduced into the internal mixer 1, having a capacity of 40 l. The homogeneous primary polymer mixture is obtained after a mixing time, including the feeding time, of between 300 and 400 s. When the temperature of the mixture has reached 130° C., 100 g of an organic pigment based shading colorant are then added to the primary polymer mixture for a period of 20 s, making it possible to obtain the anisotropic coloring of the primary polymer mixture. The polymer mixture having a non-homogeneous coloring thus obtained is then discharged into shredder 2. Shredding is carried out for approximately 30 s and then the shredded polymer mixture is supplied to extruder 3 which, after approximately 350 s, provides a plastic polymer product in the form of a strip of polymer which is then processed in the hot air vulcanizer 4, the temperature of which is 280° C., for 600 s. The polymer strip is cooled down to ambient temperature at the exit from the vulcanizer by passing along a conveyor belt 5 comprising a water cooling system, for a period of approximately 600 s. The polymer strip feeds a hollow punch 6 which produces polymer panels of different shapes by cutting the polymer strip. The resulting strip pierced with holes feeds the grinder 7, which has a grinding capacity of approximately 10 kg/minute and the size of the majority of granules obtained is between about 3 and about 5 mm, depending on the size of the grinder screen. The granules are then mixed together in a troughs mixer to form a homogeneous whole.

EXAMPLE 2

17 kg of rubber and the additives, plasticizer (1 kg), fillers (37 kg), vulcanizing agents (2 kg) and a basic colorant (3 kg) are introduced into the internal mixer 1, having a capacity of 40 l. The homogeneous primary polymer mixture is obtained after a mixing time, including the feeding time, of between 300 and 400 s. When the temperature of the mixture has reached 130° C., 100 g of an organic pigment based shading colorant are then added to the primary polymer mixture for a period of 20 s, making it possible to obtain the anisotropic coloring of the primary polymer mixture. The polymer mixture having a non-homogeneous coloring thus obtained is then discharged into shredder 2. Shredding is carried out for approximately 30 s and then the shredded polymer mixture is supplied to extruder 3 which, after approximately 350 s, provides a plastic polymer product in the form of a strip of polymer which is then processed in the hot air vulcanizer 4, the temperature of which is 280° C., for 600 s. The polymer strip is cooled down to ambient temperature at the exit from the vulcanizer by passing along a conveyor belt 5 comprising a water cooling system, for a period of approximately 600 s. The polymer strip feeds the grinder 7, which has a grinding capacity of approximately 10 kg/minute and the size of the majority of granules obtained is between about 3 and about 5 mm, depending on the size of the grinder screen. The granules are then mixed together in a trough mixer to form a homogeneous whole.

EXAMPLE 3

Production of a floor coating cast in situ of the ®Haltopex type based on granules obtained according to Example 1 or 2.

On the substrate to be covered, a wide brush is used to apply a bond coat made of polurethane resin in a proportion of 100 g/m². Immediately after the bond coat has been applied and in proportion as the work progresses, the body layer formed of polyurethane resin and granules with a shaded appearance of anisotropic coloring is applied in a proportion of 8.5 kg/m². This layer is drawn by means of a rule moving over 9 mm thick slats and then smoothed using a metallic mortar board trowel. Setting of the body layer is obtained in 12 hours and the layer is then sanded or buffed: a refill is then applied using a polyurethane resin pigmented with the colors of the granules. Once the filling has hardened, the coating obtained is sanded or buffed with a floor-sanding machine provided with No. 60 paper and is polished with a disk-sander using No. 90 paper. A polyurethane resin based varnish is applied 12 hours afterwards using short-hair roller.

What is claimed is:

1. A process for transforming a polymer base, having a shaded appearance of anisotropic coloring, into a finished article, said process comprising mixing a base polymer and additives, of adding a shading colorant to the polymer mixture, followed by incomplete homogenization of the shading colorant in the polymer mixture to form the polymer base with a shaded appearance of anisotropic coloring, subsequent shaping to an intermediate predetermined shape, and vulcanization and cooling as applicable, breaking up the shaded polymer base into individualized elements and aggregation of said elements in any desired arrangement to obtain the finished article.

2. The process according to claim 1, wherein, during the breaking up operation, the polymer base is broken up into individualized elements of different shapes and/or sizes.

3. The process according to claim 1, wherein, during the breaking up operation, the polymer base is cut into panels having a predetermined size and shape.

4. The process according to claim 2, wherein, during the breaking up operation, the polymer base is ground into granules having sizes within a determined range.

5. The process according to claim 1, wherein the aggregation operation includes the incorporation of the individualized elements into a binder.

6. The process according to claim 1, wherein the aggregation operation concerns granules and/or panels having a predetermined shape and size, in order to obtain a surface coating.

7. The process according to claim 1 wherein the aggregation operation produces panels of a predetermined size and shape and/or granules, for obtaining molded articles.

8. The process according to claim 1, wherein the stage of incomplete homogenization of said shading colorant in the polymer mixture is carried out for a duration fixed as a function of desired coloring anisotropy characteristics of the polymer mixture.

9. The process according to claim 1, wherein the shading colorant is added during the operation of mixing the base polymer and the additives, the operation of mixing the whole being continued for the time required for the polymer-additives mixture to be homogeneous and corresponding to the desired heterogeneity of the distribution of the shading colorant in the mixture.

10. The process according to claim 1, wherein the shading colorant is incorporated in an internal mixer brought to a temperature ranging from approximately 100° C. to approximately 150° C.

11. The process according to claim 1, wherein the shading colorant is added subsequently to the operation of mixing the base polymer and the additives.

12. The process according to claim 1, wherein the shading colorant is added during the intermediate shaping operation, with the intermediate shaping apparatus performing incomplete homogenization of the shading colorant.

13. The process according to claim 1, wherein the shading colorant is added at rolls of the mixer or at a calender for the incomplete homogenization of said shading colorant.

14. The process according to claim 1, wherein the various operations for obtaining individualized elements are carried out on a continuous production line.

15. The process according to claim 1, wherein the different stages are carried out batchwise.

16. The process according to claim 1, wherein the base polymer is selected from the group of polymers consisting of rubber, elastomer and thermoplastic synthetic high polymer.

17. The process according to claim 1, wherein the additives added to the base polymer include one or more colorants.

18. The process according to claim 1, wherein the shading colorant is constituted by several colorants.

19. Polymer granules obtained by grinding a polymer base into individualized elements, usable for manufacturing of surface coatings or of molded articles, said individualized elements comprising a plurality of granules, each granule presenting anisotropic shades of coloring.

20. A finished article including individualized elements as defined in claim 19 and constituting an agglomerate of said individualized elements, each having a shaded appearance of anisotropic coloring for making up said finished article.

21. The article according to claim 20, further comprising a binder for holding the individualized elements.

22. The article according to claim 20, wherein the individualized elements are panels having a predetermined size and shape, representational patterns and/or granules.

23. The article according to claim 20, wherein the individualized elements are panels having a predetermined size and shape, representational patterns and/or granules as a surface coating.

24. The article according to claim 20, wherein the individualized elements are panels having a predetermined size and shape, representational patterns and/or granules as a tile or a slab of a surface coating.

25. The article according to claim 20, wherein the individualized elements are panels having a predetermined size and shape, representational patterns and/or granules, which have been molded into said article.

26. The process according to claim 1, wherein the base polymer is selected from the group consisting of styrene-butadiene rubber, ethylene-propylene-diene rubber monomere.

* * * * *

UNITED STATES PATENT AND TRADEMARK OFFICE
CERTIFICATE OF CORRECTION

PATENT NO.    : 6,787,588 B2
DATED         : September 7, 2004
INVENTOR(S)   : Jacques Berlemont It is certified that error appears in the above-identified patent and that said Letters Patent is hereby corrected as shown below:

<u>Column 12,</u>
Lines 3-4, should read -- and ethylene-propylene-diene rubber --.

Signed and Sealed this

Fifth Day of July, 2005

JON W. DUDAS
*Director of the United States Patent and Trademark Office*